United States Patent [19]

Ros

[11] Patent Number: 5,237,784

[45] Date of Patent: Aug. 24, 1993

[54] SHELTER CONTAINER FIT FOR HABITATION WITH EXTENDIBLE INNER VOLUME

[75] Inventor: Eric Ros, Strasbourg, France

[73] Assignee: Lohr Industrie, Hangenbieten, France

[21] Appl. No.: 802,901

[22] Filed: Dec. 6, 1991

[30] Foreign Application Priority Data

Dec. 6, 1990 [FR] France ................................ 90 15456

[51] Int. Cl.⁵ .............................................. E04H 1/00
[52] U.S. Cl. ........................................ 52/79.5; 52/67; 52/69
[58] Field of Search ..................... 52/79.5, 71, 69, 143, 52/DIG. 11, 127.2, 126.1, 126.3, 126.5, 126.7, 126.6

[56] References Cited

U.S. PATENT DOCUMENTS

| | | | |
|---|---|---|---|
| 1,156,693 | 10/1915 | Koger | 52/69 |
| 2,944,852 | 7/1960 | Snyder | 52/67 |
| 3,283,452 | 11/1966 | Hayes | 52/67 |
| 3,341,986 | 9/1967 | Brosig | 52/67 |
| 4,987,706 | 1/1991 | Hughes | 52/79.5 |

FOREIGN PATENT DOCUMENTS 91122  1/1958  Norway ............................. 52/143

Primary Examiner—Richard E. Chilcot, Jr.
Assistant Examiner—Beth A. Aubrey
Attorney, Agent, or Firm—Schwartz & Weinrieb

[57] ABSTRACT

A habitable shelter/container with an extendable inner space, characterized in that it comprises unfolding lateral extensions, corner uprights (7) incorporating a retractable prop (51) for lateral extension, support and lifting, and a bottom structure or base-frame (11) provided on its undersurface with bearing and guide means for moving it on a surface or bearing track on a transport vehicle. The invention is of interest to builders of shelters for industrial use and for use as dwellings, for example, building-sites, camps and living quarters.

22 Claims, 19 Drawing Sheets

FIG. 10
FIG. 11
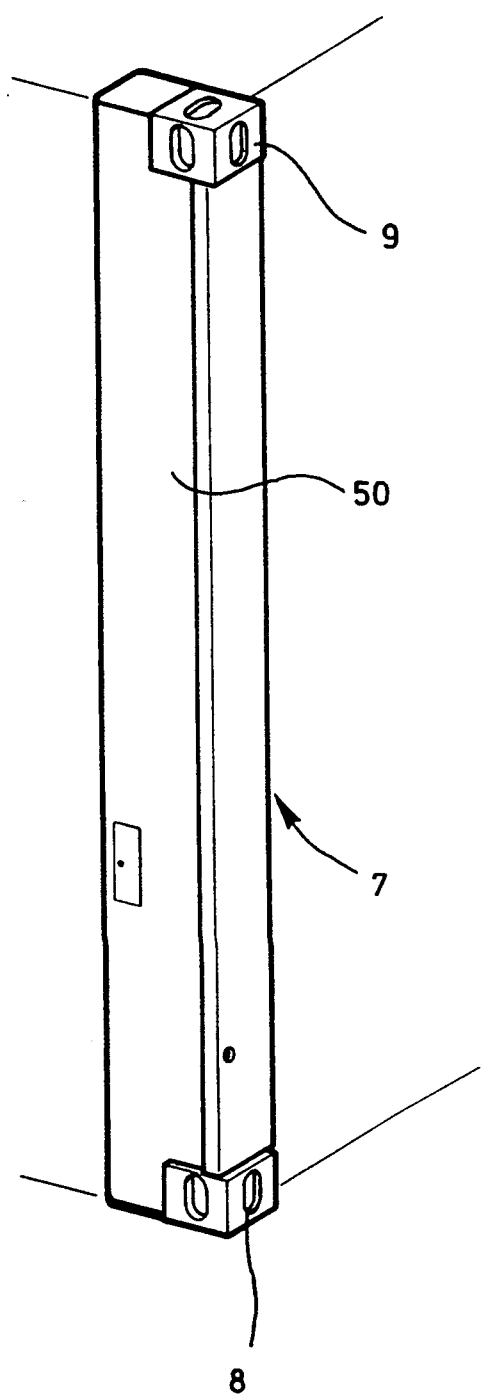
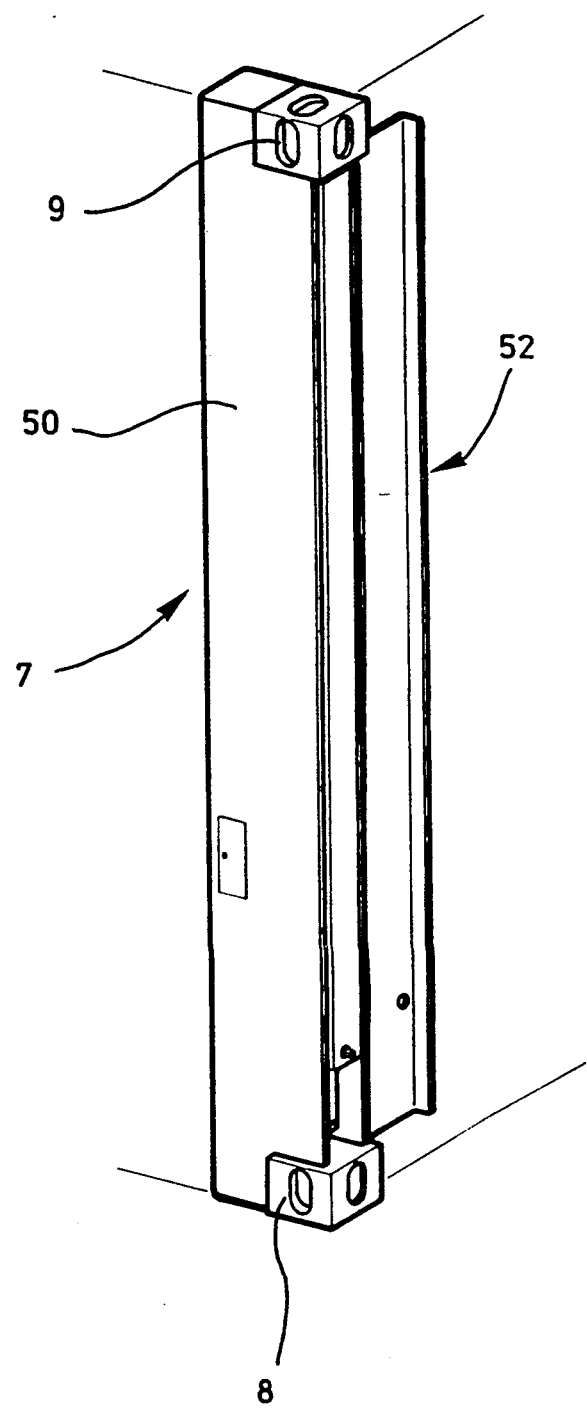

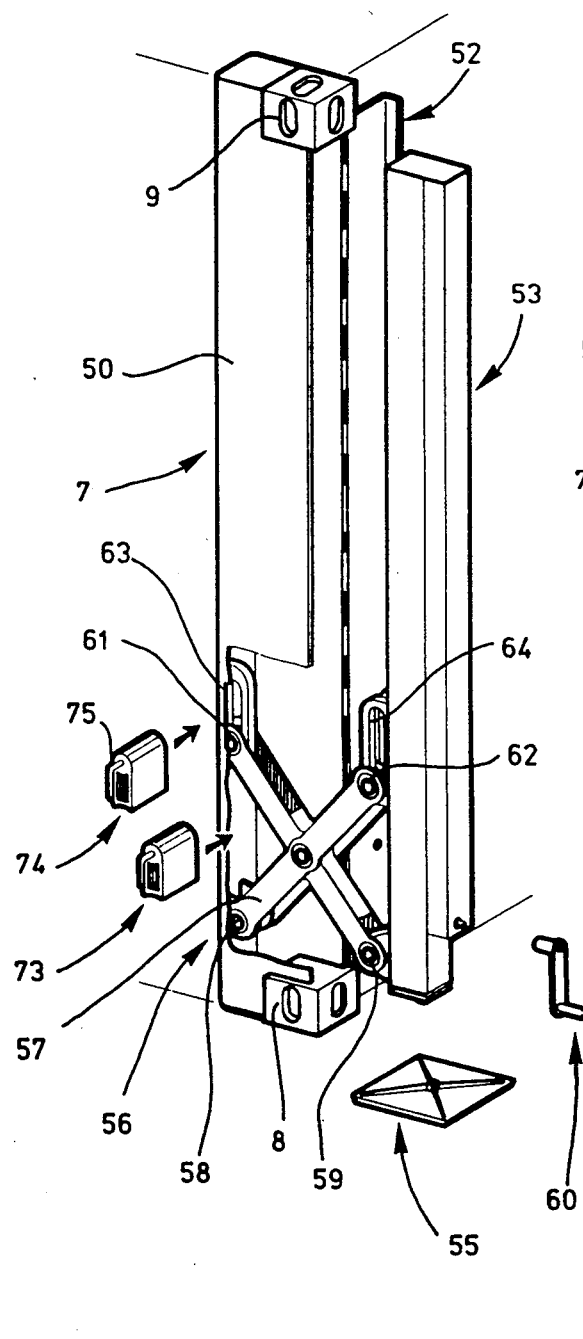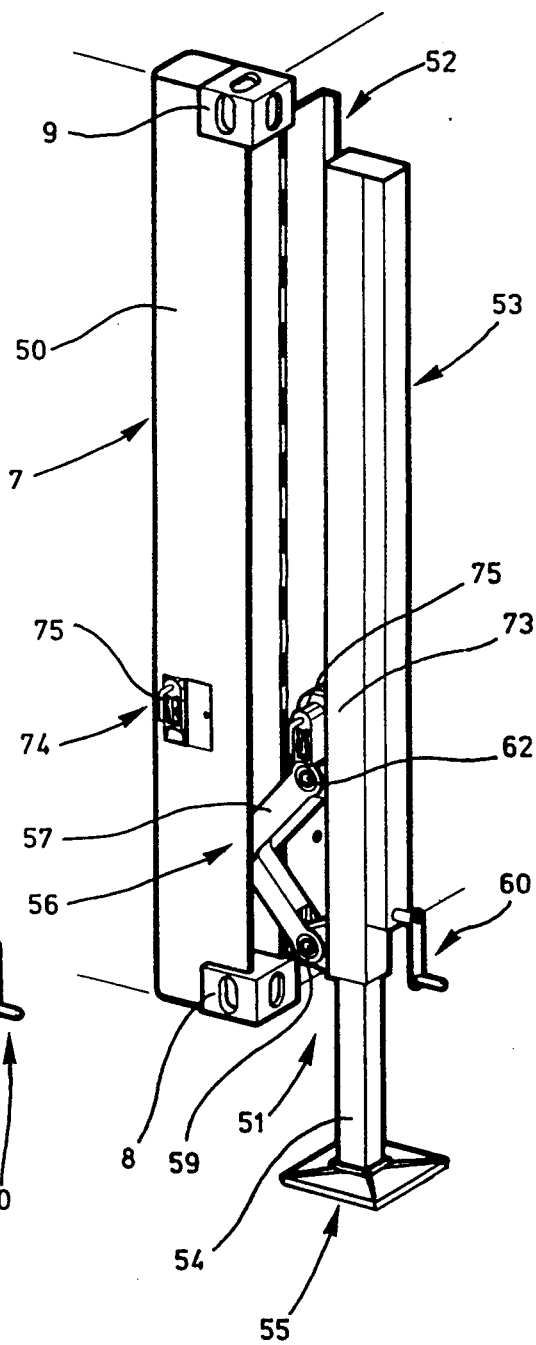

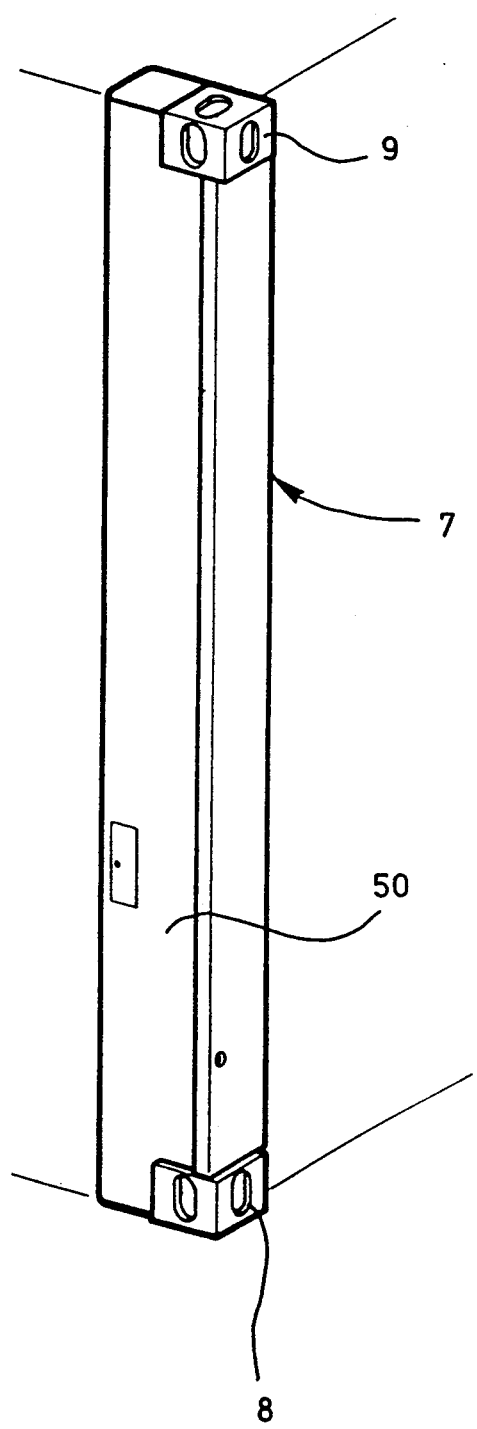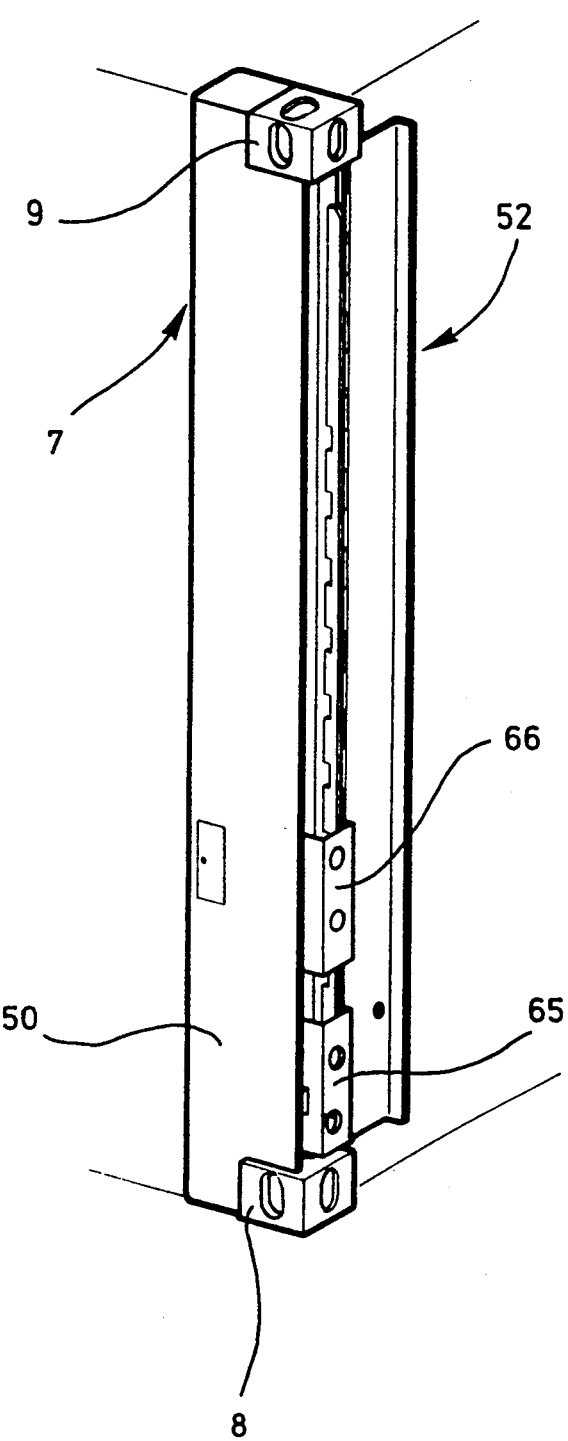

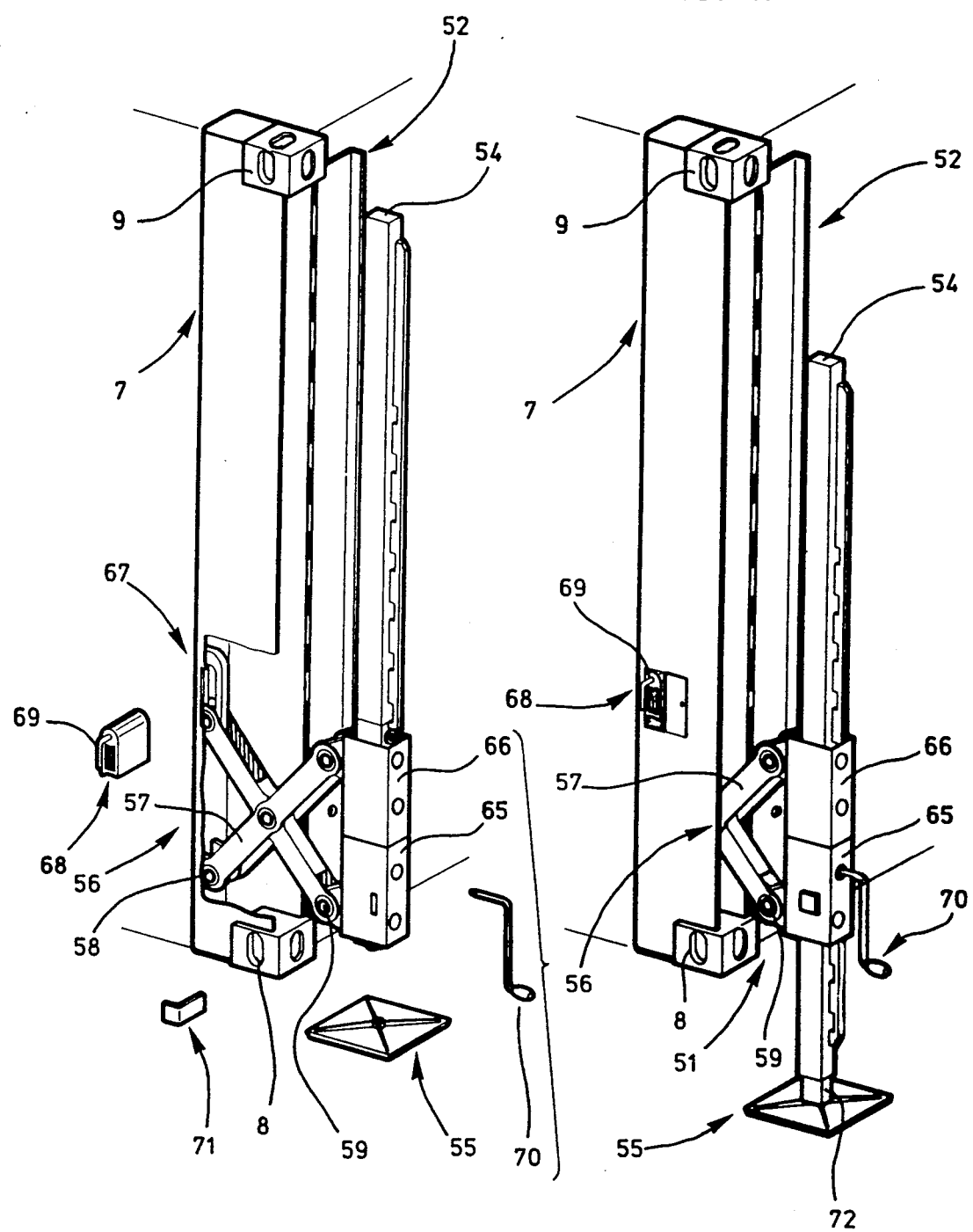

SHELTER CONTAINER FIT FOR HABITATION WITH EXTENDIBLE INNER VOLUME

FIELD OF THE INVENTION

The invention relates to a transportable shelter/container having an extendable habitable inner space and capable of being fitted up in numerous ways.

BACKGROUND OF THE INVENTION

Various known kinds of containers are already used as habitable shelters.

The containers have the advantage of being movable, since they can be transported by conventional means such as rail or road transport vehicles.

The shelters have a ground support in the form of a bottom structure or underframe or stationary props, which are attached or removable.

The logistic transport vehicles comprise a loading arm used for gripping, lifting and positioning a flat deck or container on their bearing underframe.

SUMMARY OF THE INVENTION

The aim of the invention is to provide a shelter/container which is habitable, extendable, adaptable, very easy to use, and can be manipulated for the purpose of loading and transport in three different ways:

By means of props, like a swap body;

By the conventional means equipping logistic transport vehicles, or

By transport plane, using the conventional methods for transporting equipment by air.

The shelter/container according to the invention is characterised in that it comprises facade surfaces which can be extended by unfolding, corner uprights in the form of a box holding lateral extension jacks for lifting and support, and a base-frame formed on its undersurface with bearing and guide structures adapted to co-operate with a bearing surface or track on a transport vehicle or aircraft.

The shelter/container according to the invention has numerous advantages, such as those non-exhaustively listed hereinafter:

The presence of retractable supporting and lifting props laterally offset in the operating position for the purpose of travel under the raised shelter of a road transport vehicle for the purpose of loading on to the vehicle underframe;

A composite bottom structure enabling the shelter to be transported by the various existing means, inter alia by logistic transport vehicles or transport planes, without any conversion or adjustment;

A habitable area which can be extended via any of its major sides, and

Structures suitable for gripping by a logistic transport vehicle.

BRIEF DESCRIPTION OF THE DRAWINGS

The technical features and other advantages of the invention are set out in the following description, by way of non-limitative example, of an embodiment with reference to the accompanying drawings in which like reference characters designate like or corresponding parts throughout the several views and wherein:

FIGS. 10–13 are diagrammatic views illustrating a sequence for operating a first kind of lifting and support prop as follows:
FIG. 10: upright closed;
FIG. 11: upright open;
FIG. 12: prop extended;
FIG. 13: prop in contact with the ground;

FIGS. 14–17 are diagrammatic views illustrating a sequence for operating a second kind of lifting and supporting prop as follows:
FIG. 14: upright closed;
FIG. 15: upright open;
FIG. 16: prop extended;
FIG. 17: prop in contact with the ground;

DETAILED DESCRIPTION OF THE ILLUSTRATED EMBODIMENTS

Figure 1:
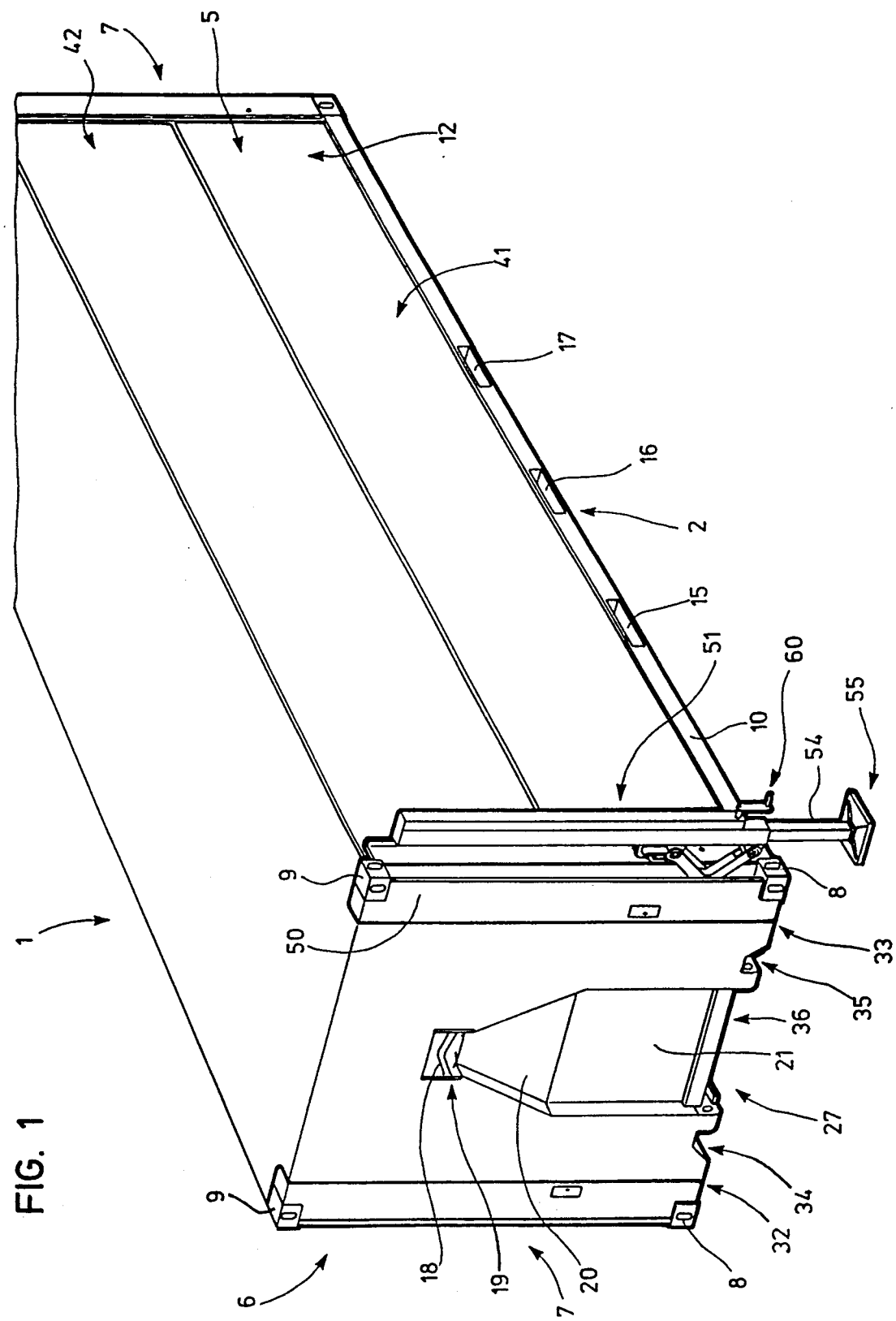
FIG. 1 is a perspective view of the shelter according to the invention, showing an extended prop testing on the ground.

The modular shelter according to the invention, when in the closed transport position, has the general form of a container of the kind used in rail or sea transport, comprising two flat surfaces, a top or roof surface 1 and a bottom or floor surface 2, surrounded by sides made up of two end faces 3, 4, a front surface 5 and a rear surface 6.

The minor or end surfaces and the side surfaces are separated by corner uprights such as 7, equipped at their top and bottom ends with attached coupling members, 8 at the bottom and 9 at the top, adapted to co-operate with securing bolts (not shown). The coupling members 8, 9 are standardised and known as "ISO corners".

Figure 9:
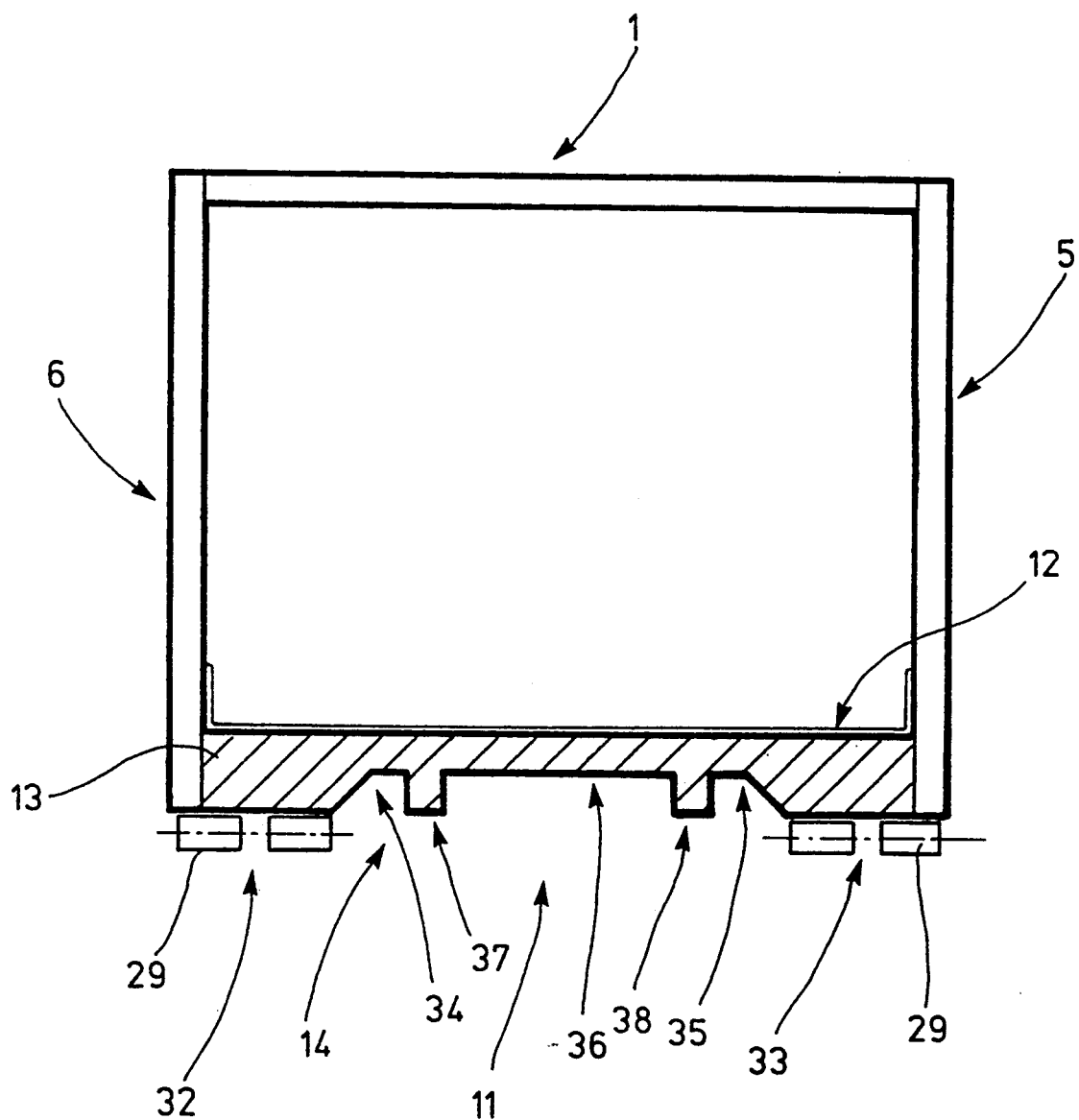
FIG. 9 is a view in cross-section of the bottom support structure.

The corner uprights 7 are connected at their ends by longitudinal members such as 10, forming a skeleton made up of side and top frames and mounted on a bottom structure or underframe, hereinafter called a base frame 11. The base frame comprises a floor surface 12, an underframe 13 and a special bottom structure 14 surrounded by a strengthening frame, as best preliminarily seen in FIG. 9.

The longitudinal members in the strengthening frame are formed with recesses such as 15, 16 or 17 for the forks of a lifting truck.

With a view to handling and transport, the shelter/container according to the invention is also equipped with gripping structures and components such as a gripping ring 18 in a recess 19 at the end of a converging guide cavity 20 above a special recessed space 21, the gripping elements being, for example, a crane 22 having a hooked arm 23, or a bearing frame 24 comprising guide rails 25 and end rollers 26, as best seen in FIGS. 18 and 20–25, these elements constituting the means for gripping, loading and unloading on logistic transport vehicles (French abbreviation VTL), and provided either at the front or the rear of the container on one of its small end surfaces.

Figure 31:
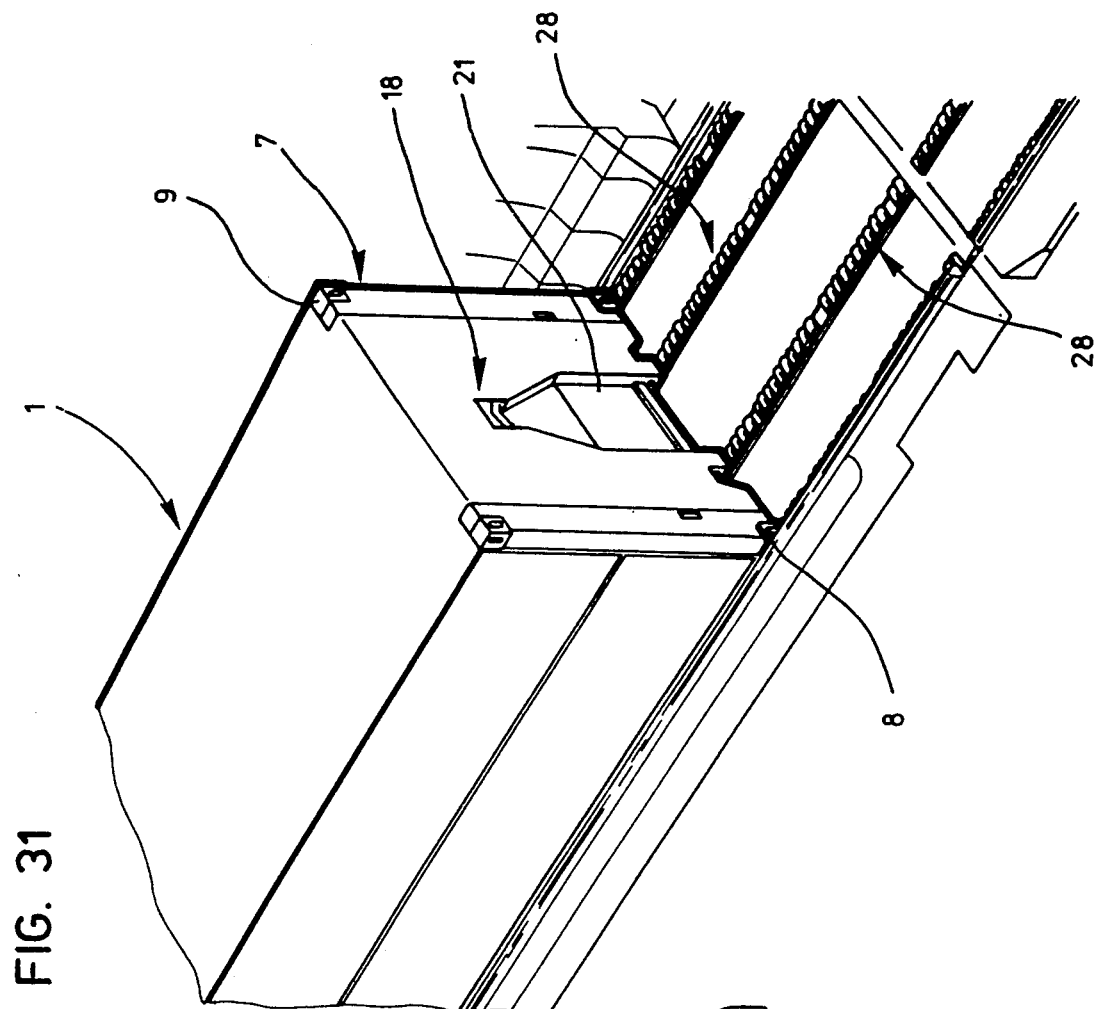
FIG. 31 is a perspective view of the shelter/container on a roller track of the kind used as loading means for containers transported by air.
Figure 32:
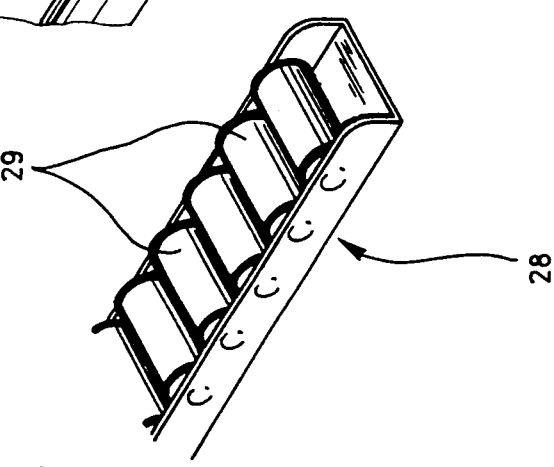
FIG. 32 is an enlarged perspective view of a roller trackway.
Figure 33:
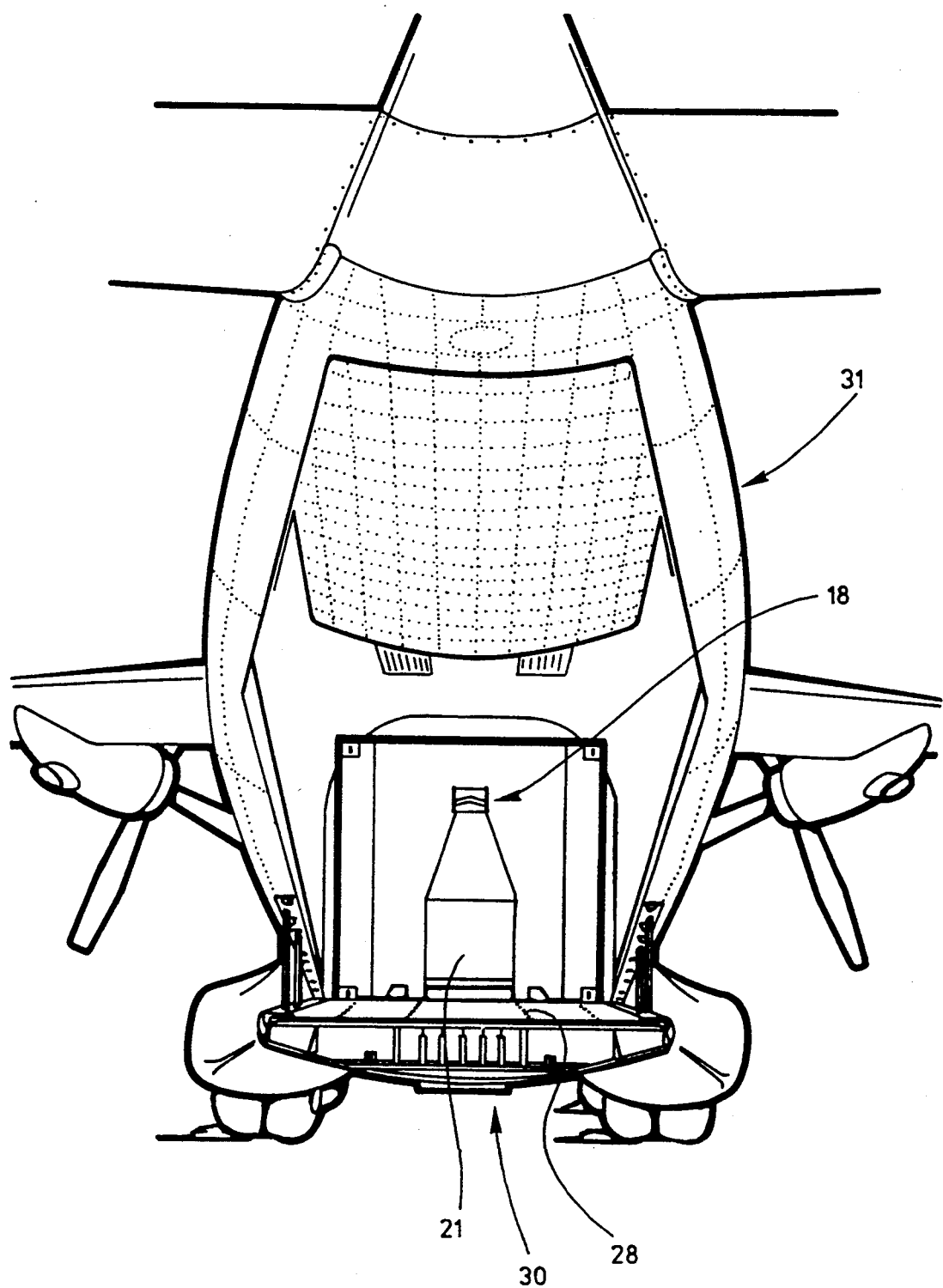
FIG. 33 is a perspective rear view of the shelter/container when loaded on to a transport plane.

Below the lower underframe structure 11, the shelter/container comprises guide and rolling means 27 for loading it and conveying it on "VTL" vehicles and on tracks 28 comprising supporting rollers such as 29 on the loading floors 30 of transport planes 31 (FIGS. 31 to 33). These means will be described in detail hereinafter.

The special undersurface of the lower base-frame structure 11 has the shape of two straight longitudinal flat regions 32, 33, starting from the longitudinal edges towards a central longitudinal zone and followed, on either side of this zone, by two longitudinal recesses 34, 35 co-operating with the guide rails 25 of the bearing structures of VTL vehicles. The central part consists of a special recessed space 36 having a sufficient width and depth for the base-frame 11 to move along the bearing structure of the logistic transport vehicle in spite of the presence of components or elements which project into the aforementioned central zone of the bearing underframe.

The central part is bounded on each side by a longitudinal bearing surface 37, 38 adapted to come in contact with the train of rollers 29 on a conveying track 28 such as that equipping the loading floors of transport planes 31.

Advantageously the space enclosed by the shelter can be increased in the operating position by means of the side facade panels 39, 40 and the horizontal floor panel 41 and roof panel 42, which are pivoted around the corner uprights 7 and the longitudinal members 10 respectively, in order to form additional floor and ceiling surfaces which, when assembled, form a habitable extension 43 in the form of a canopy 44 along one or both major side surfaces.

The extensions are each covered by one or more waterproof covers for complete sealing-tightness. They are secured to the neighbouring structures, for example, by hooks or elastic rubber cables. Each cover is provided, for example, with two doors and two windows.

The composite openable facade panels as shown in FIGS. 3 to 8 may, for example, be of two kinds.

In a first variant (FIGS. 3 to 5) the facade comprises longitudinal panels for extending the floor 41 and the roof 42 and pivoting on longitudinal members, and shutter-like side panels 39, 40 each pivoted to the uprights 7 along a hinge line 45, 46. The assembly opens like a cardboard box or case and the panels are secured and attached to or on one another in known manner to form a cover.

Figure 7:
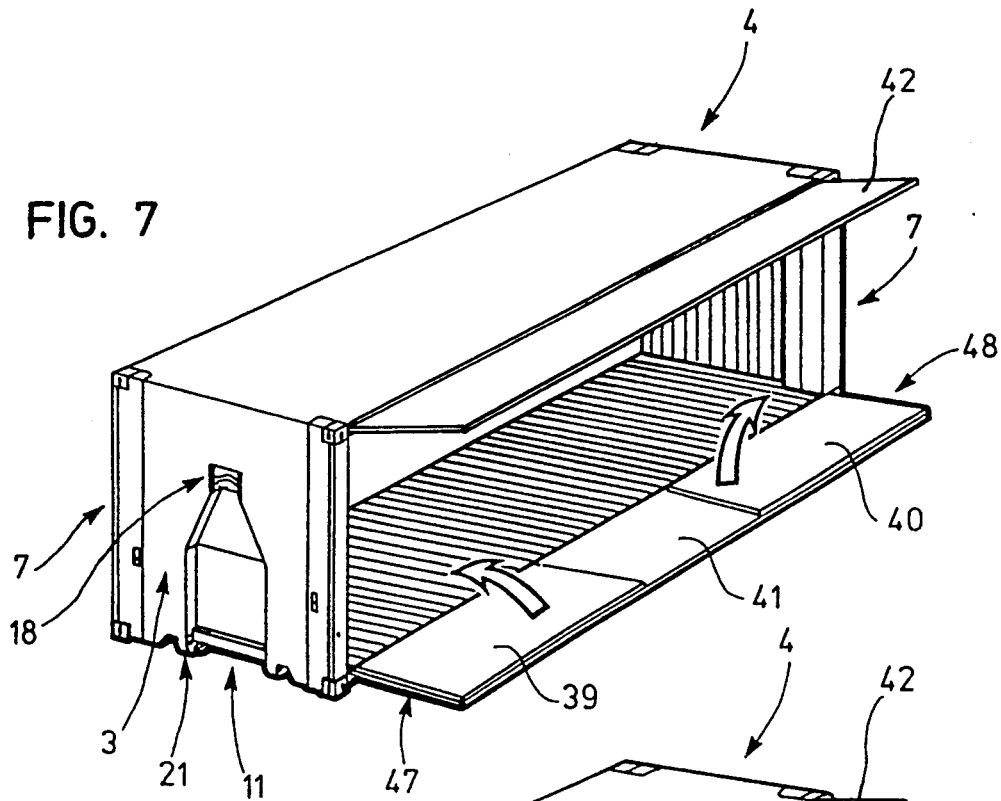
Figure 8:
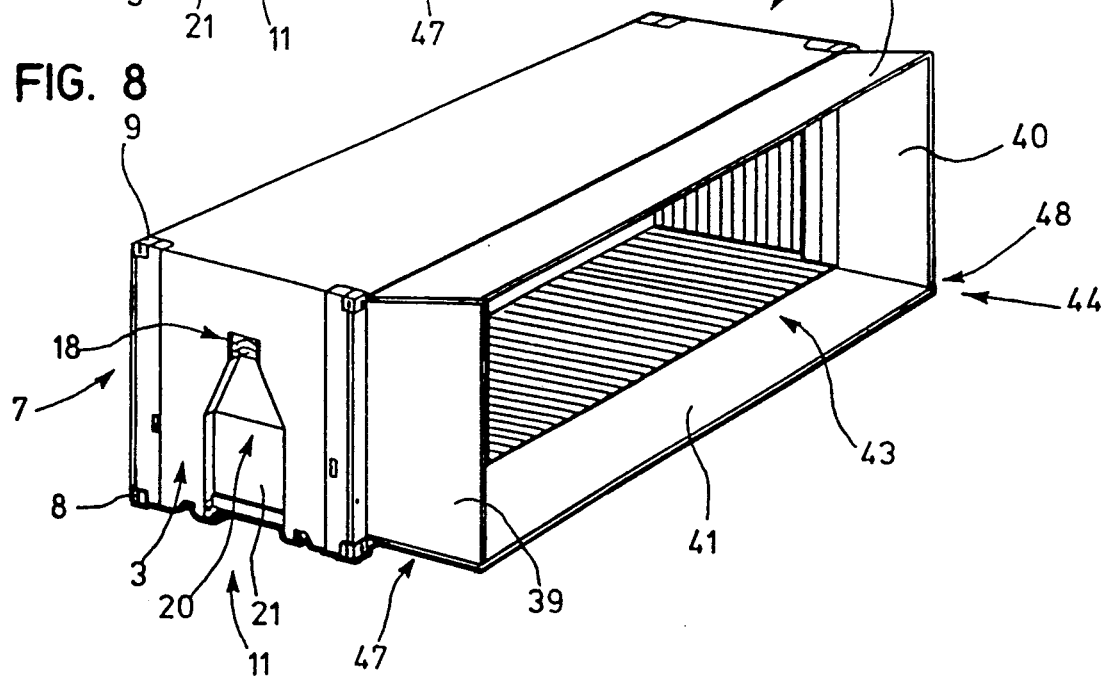

In a second variant (FIGS. 6 to 8) the facade is likewise made up of longitudinal panels for extending the floor 41 and the roof 42 and pivoting on longitudinal members 10. The two side panels 39 and 40 are foldable, that is, they are pivoted to the sides of the longitudinal floor-extension panel, each along a hinge line 47 or 48, and are positioned by unfolding and lifting as shown in FIG. 7.

Figure 2:
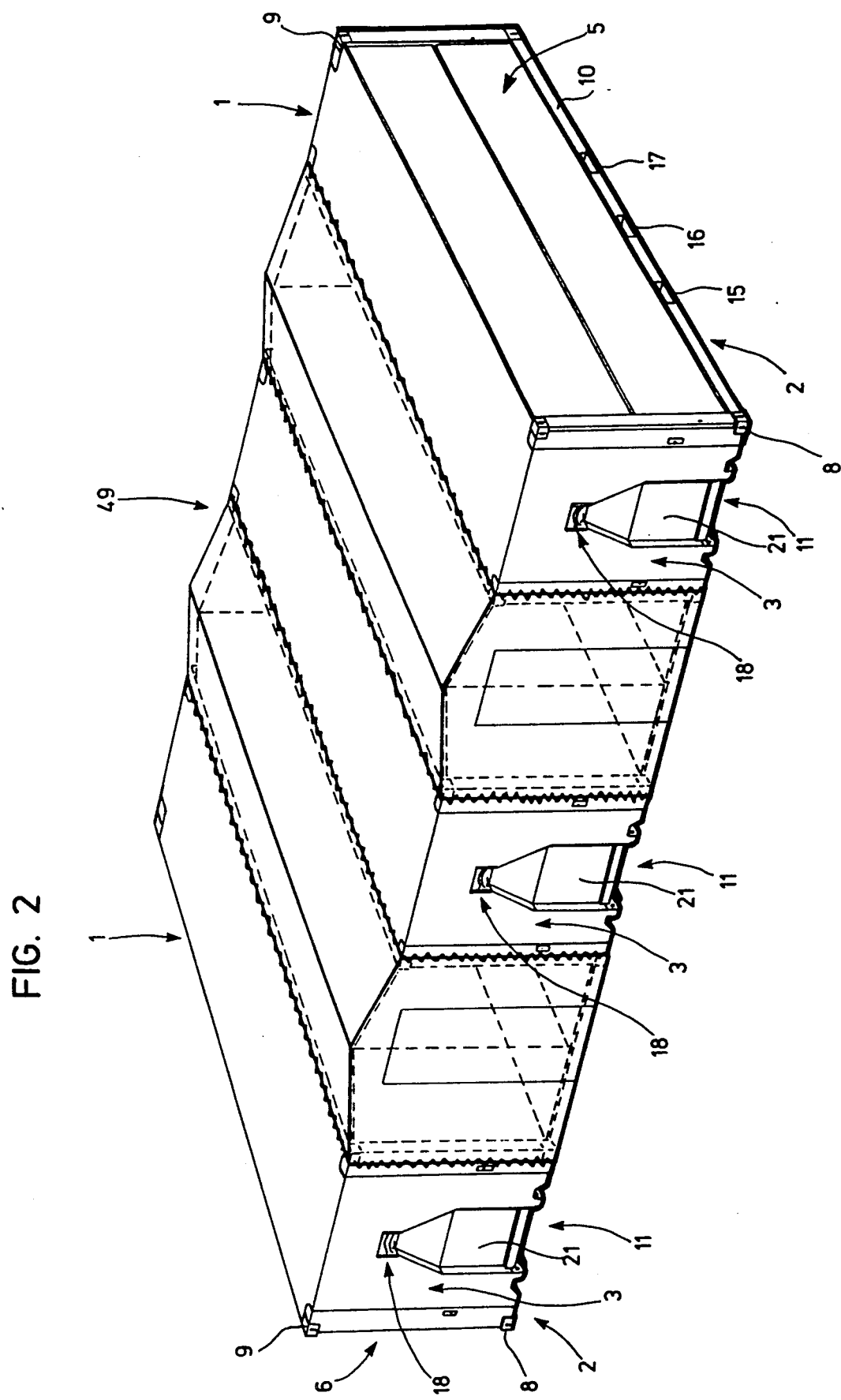
FIG. 2 is a general perspective view showing a number of shelter/containers associated by joining their canopies and grouped parallel to one another.
Figure 3:
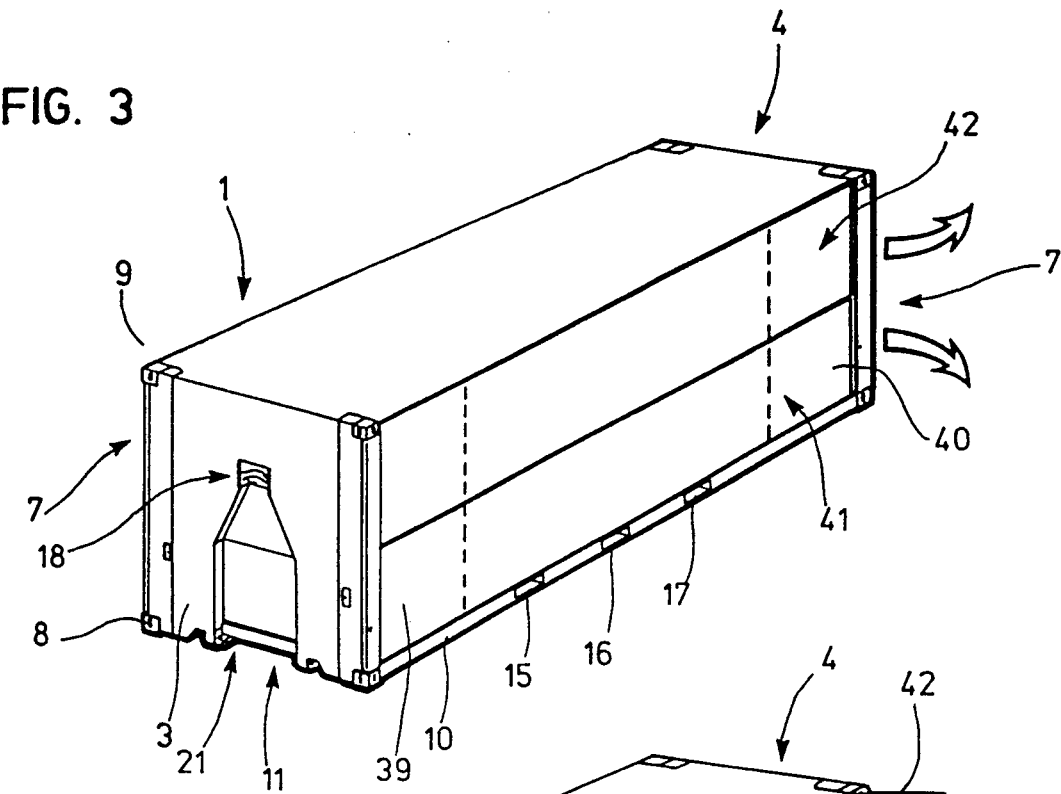
FIGS. 3–5 are successive simplified perspective views showing the sequence for opening a canopy according to a first variant.
Figure 4:
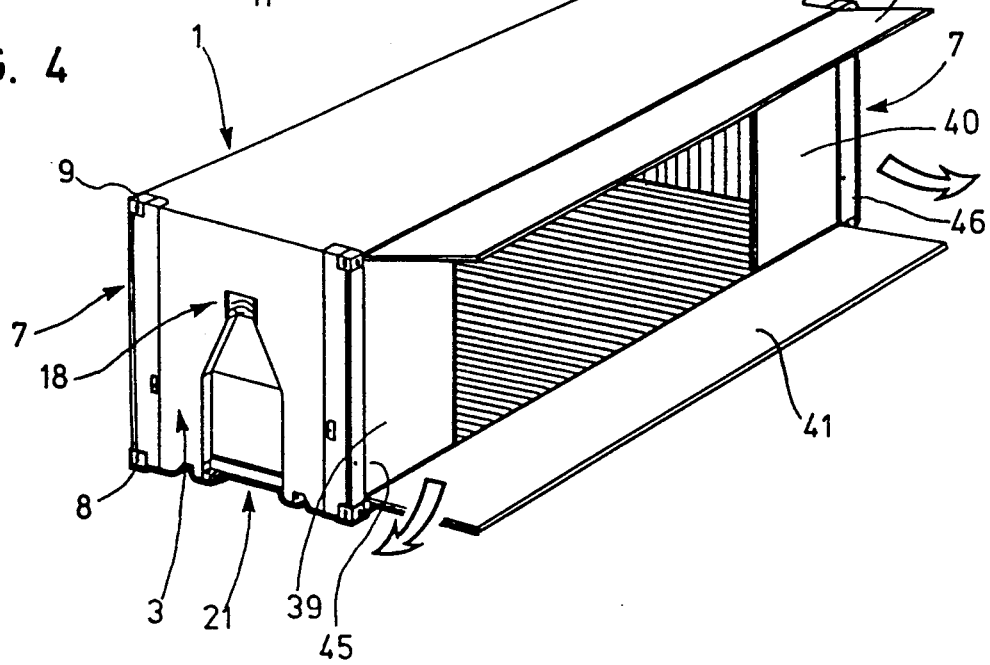
Figure 5:
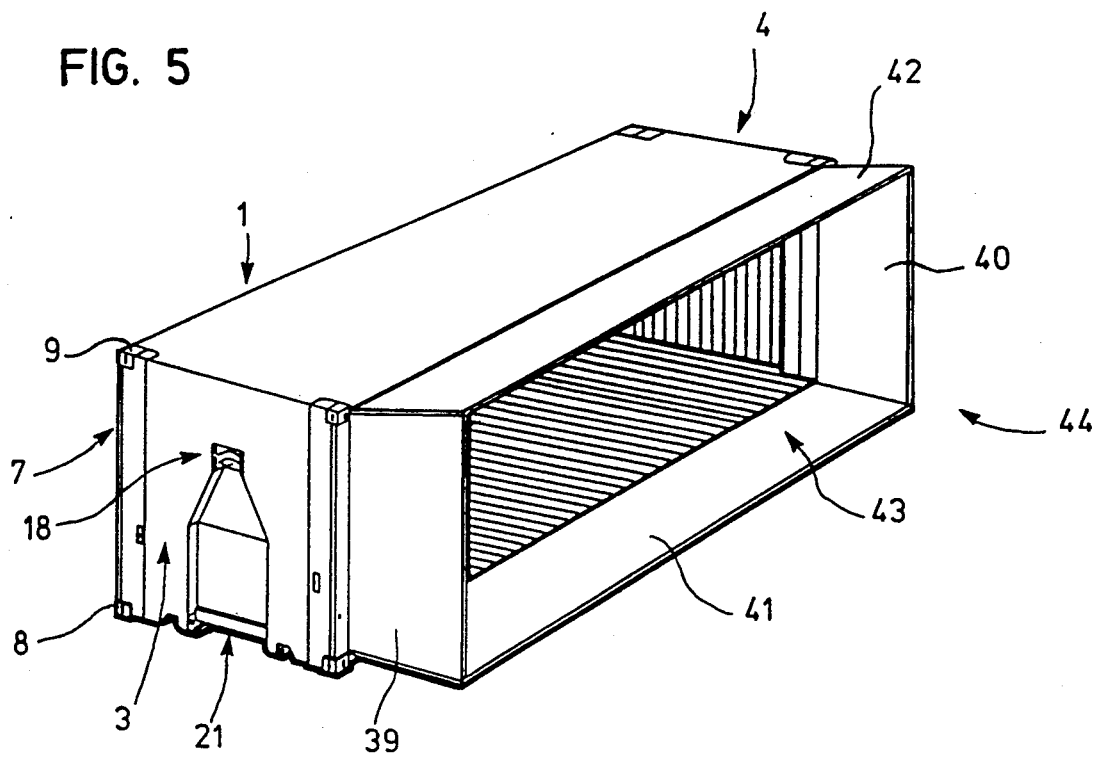
Figure 6:
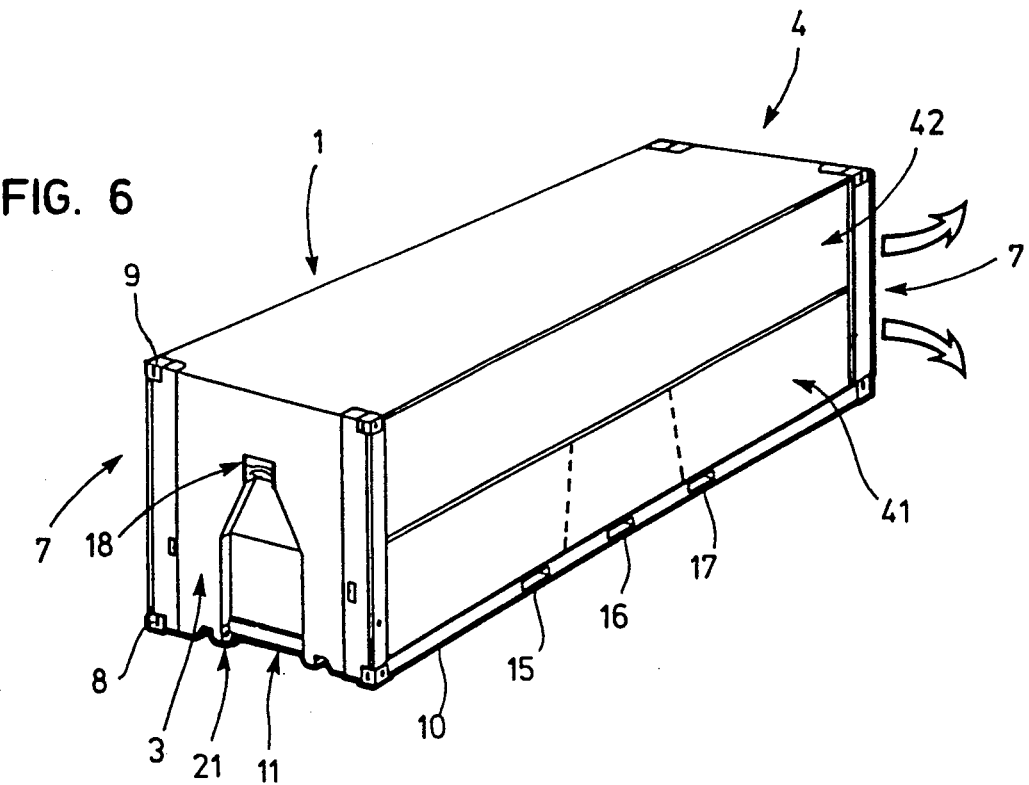
FIGS. 6–8 are successive simplified perspective views showing the sequence for opening a canopy according to a second variant.

The shelters/containers according to the invention can be assembled by conventional means so as to form more extensive habitable assemblies 49 as shown in FIG. 2.

Figure 18:
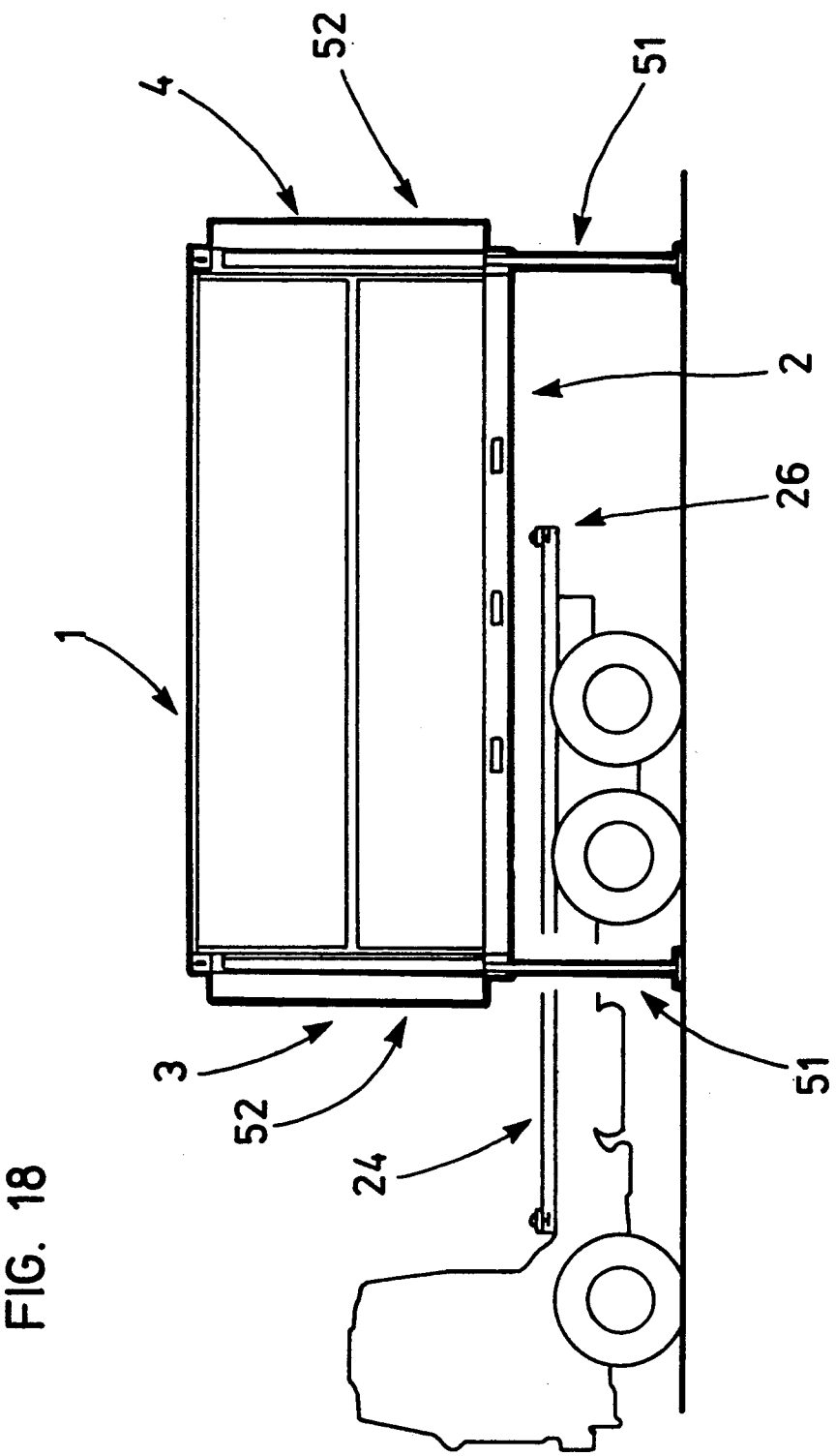
FIG. 18 is a side view of a shelter/container held on props above the underframe of a transport vehicle.
Figure 19:
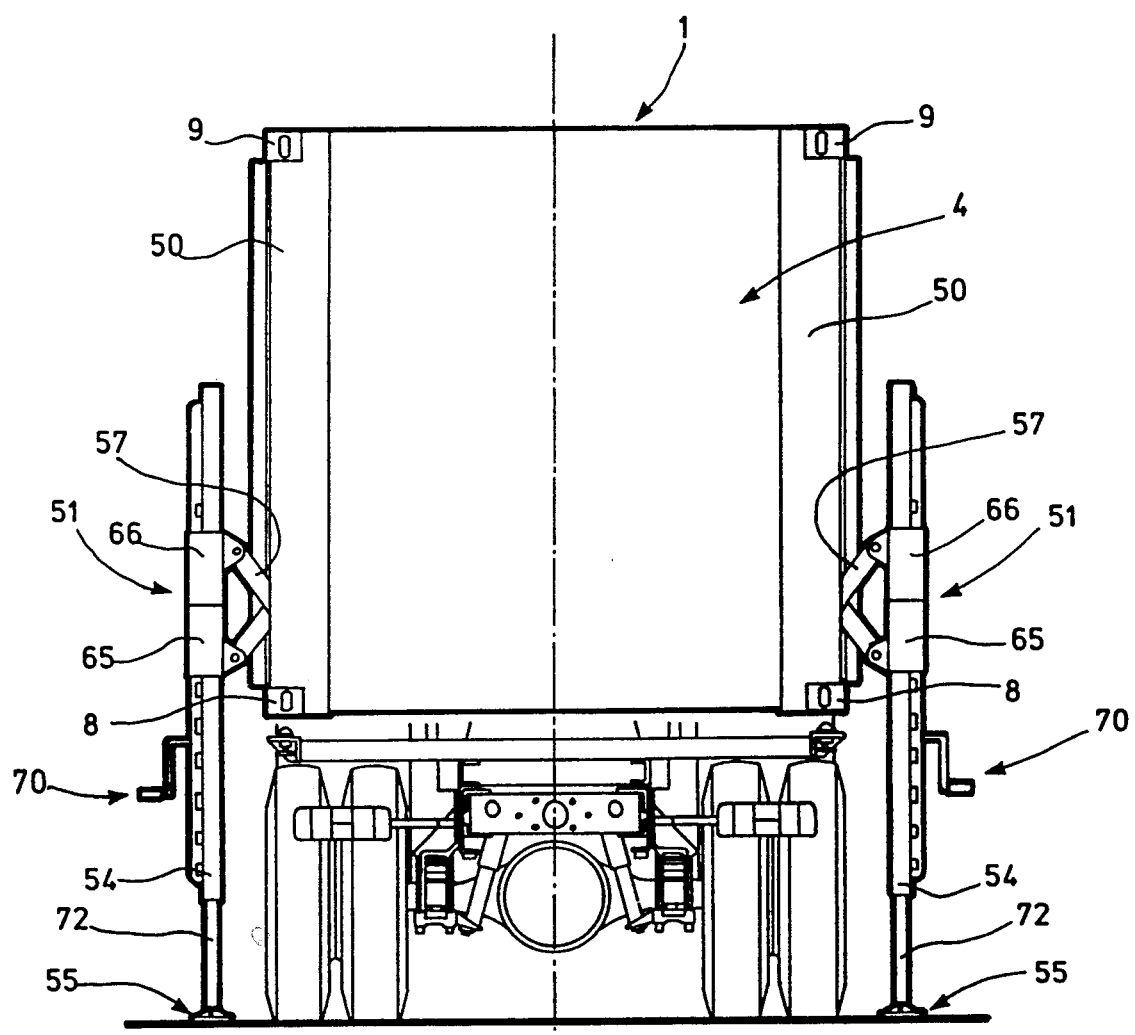
FIG. 19 is a rear view in elevation of the shelter/container on a transport vehicle represented in FIG. 18, showing the lateral offset for lifting and support provided by the retractable props.
Figure 20:
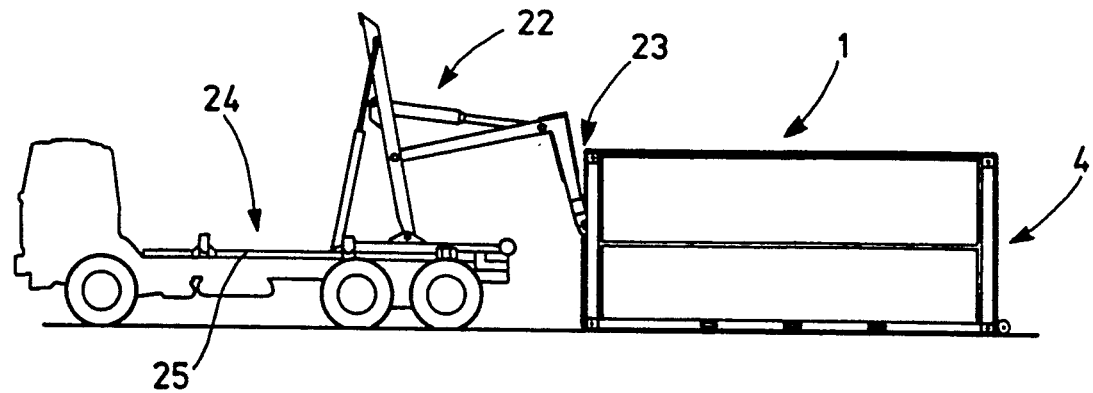
FIGS. 20–25 are diagrammatic views showing a loading phase, using the arm of a logistic transport vehicle.
Figure 21:
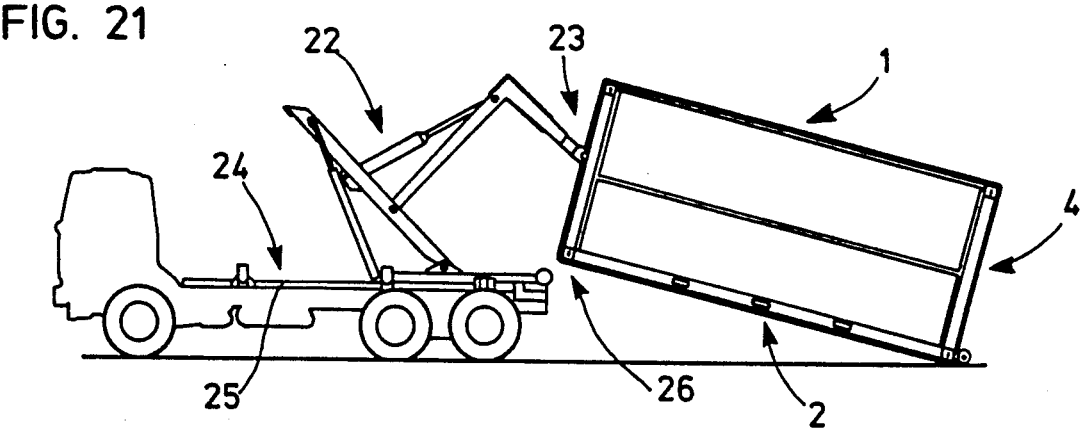
Figure 22:
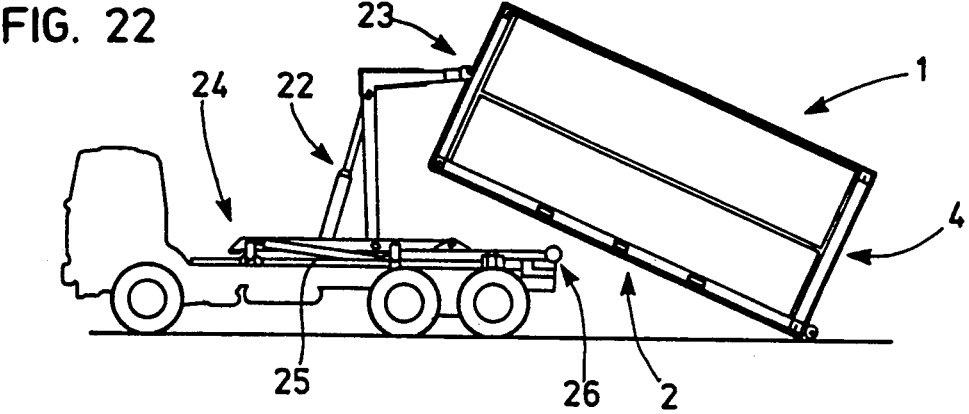
Figure 23:
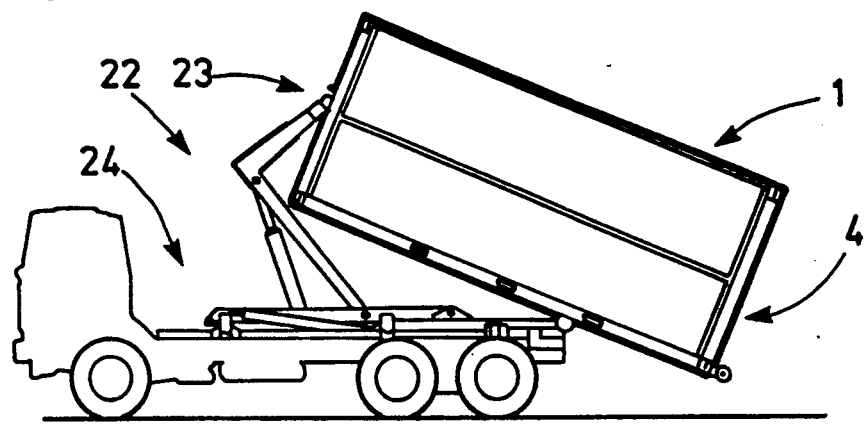
Figure 24:
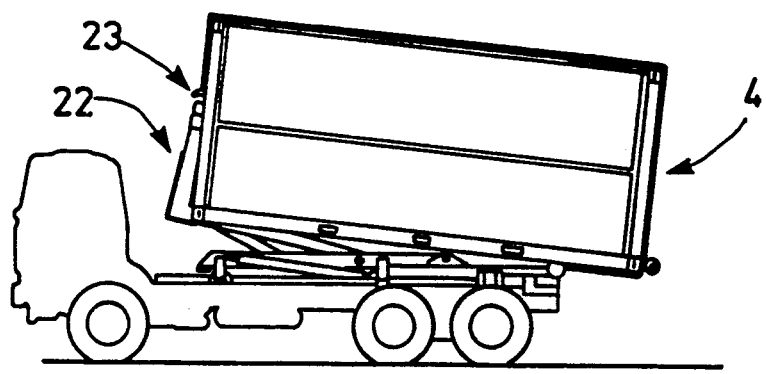
Figure 25:
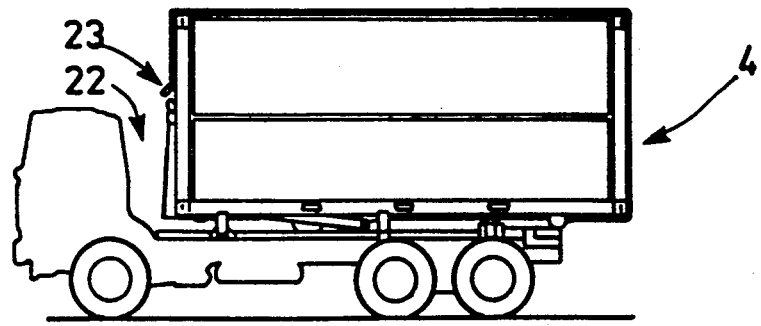
Figure 26:
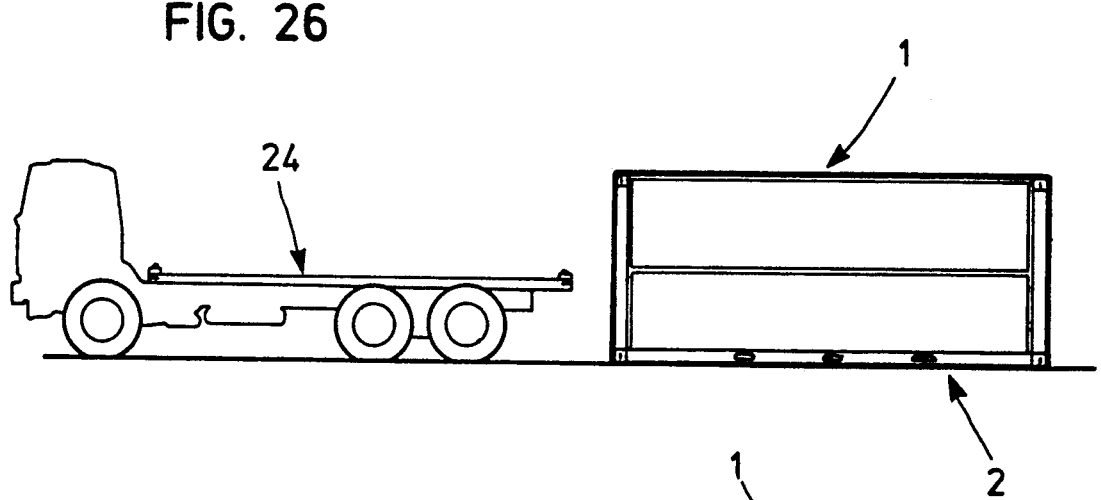
FIGS. 26–30 are diagrammatic views illustrating a loading phase in which the props are used as a lifting means.
Figure 27:
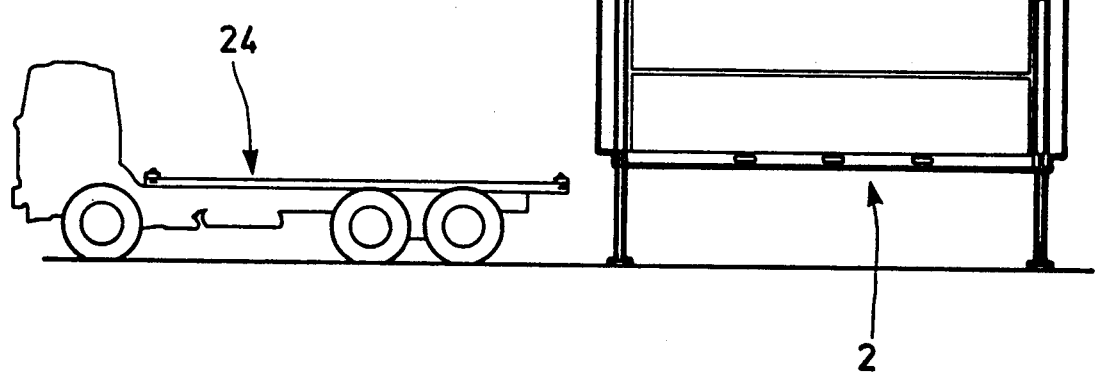
Figure 28:
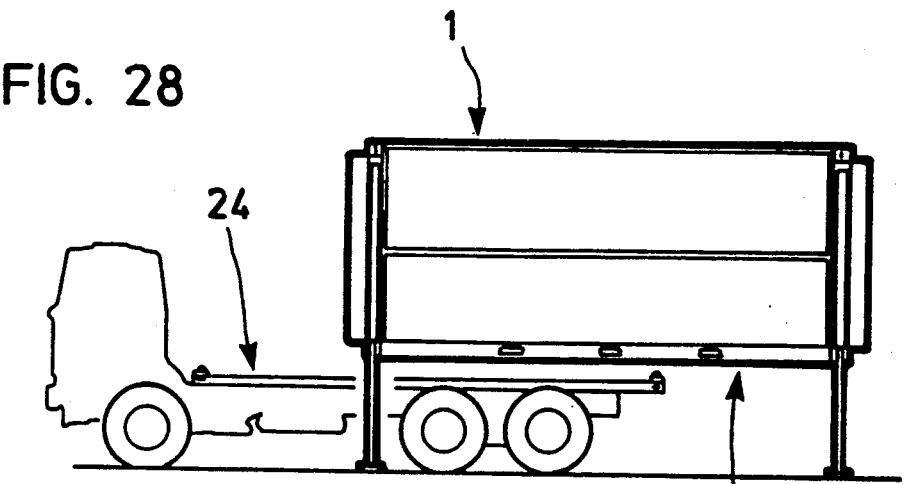
Figure 29:
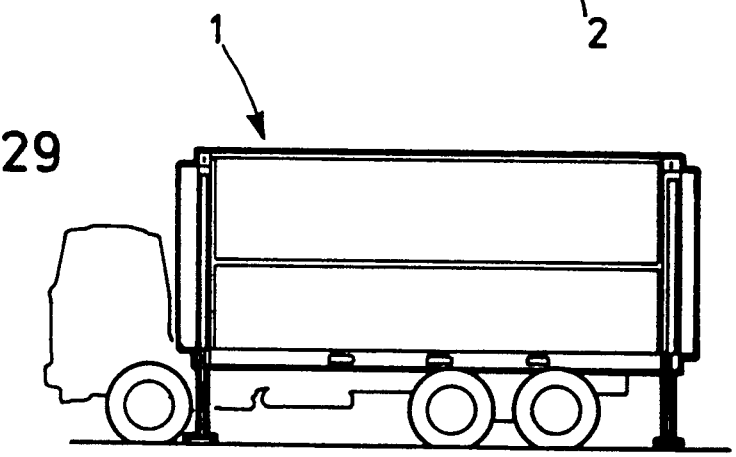
Figure 30:
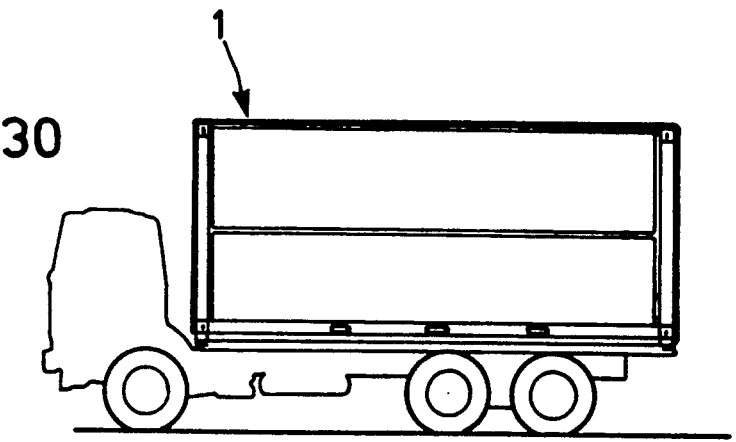

One feature of the shelter/container relates to the corner uprights 7, which are in the form of a box 50 holding props such as 51 for supporting and lifting and adapted to form a laterally offset support so that the shelter can be raised while leaving a sufficient width between supports for a transport vehicle to pass in between and be loaded with the container, simply by using the props (FIGS. 18 and 19).

The supporting and lifting props will now be described in more detail, with reference to FIGS. 10–17.

Advantageously, as shown, the props 51 are disposed in boxes 50 when not in use. The box forming each upright is closed by a lockable pivoting flap 52.

The boxes comprise a tubular body 53 telescopically receiving a driving support rod 54 resting on a bearing plate or shoe 55.

Props 51 are held vertical and are moved out of the upright in a perfect movement of translation by an extension assembly 56 comprising a double pivoted connection and in the form of a cross-piece 57 pivotably jointed at its centre, the bottom ends of the crossed components being pivotably mounted on two respective joints 58, 59 on a wall of the upright and on the base of the tubular body of the prop, whereas the top ends can move longitudinally in at least one slotted joint.

The props carried by the extension assembly 56 are of two kinds.

The first kind of prop has a longitudinal tubular body in which the support rod 54 of a screw jack slides, controlled by a crank 60. The tubular body 53 is in one piece and is attached by two top joints 61, 62 movable in slots 63, 64 (FIGS. 10 to 13).

The second kind of prop has a tubular body 53 made up of two independent tubular portions 65, 66 (FIGS. 14–17).

In the case of these props, only the top joint moves in a slot 67 secured to the upright When the prop is in the extended position, the uncovered part of the slot 67 is blocked by a locking member 68 secured by a pin 69 adapted to lock the extension in the extended position.

These props are raised by a crank 70, for example, a screw jack engaging a rack, and are held in a given vertical position by a catch or bolt 71 or any other locking component inserted into the recesses of a column 72 sliding in the driving support rod 54.

In the retracted position, the pivots of the pivoted connection of the extension assembly 56 of the one-piece tubular-body prop occupy a top position in slots 63 and 64, whereas in the extended position they occupy a bottom position, leaving a free opening in each slot. A movable locking wedge such as 73 or 74 for locking in the extended position is inserted into each opening and is held therein by a securing pin 75.

Of course, the props can be hydraulic, that is, can comprise jacks which are extended by the pressure of a liquid.

As already stated, the purpose of the laterally offset props is to increase the distance between the bearing points, so that the underframe of a transport vehicle can travel under the shelter.

Figure 36:
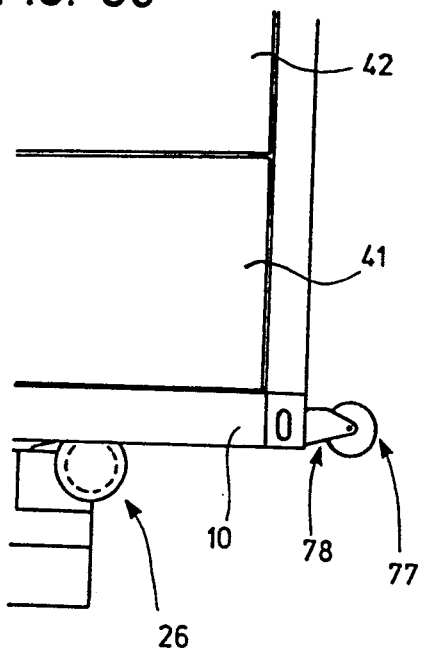
FIG. 36 is a diagrammatic rear view of the shelter/container showing how the support rollers are attached.
Figure 34:
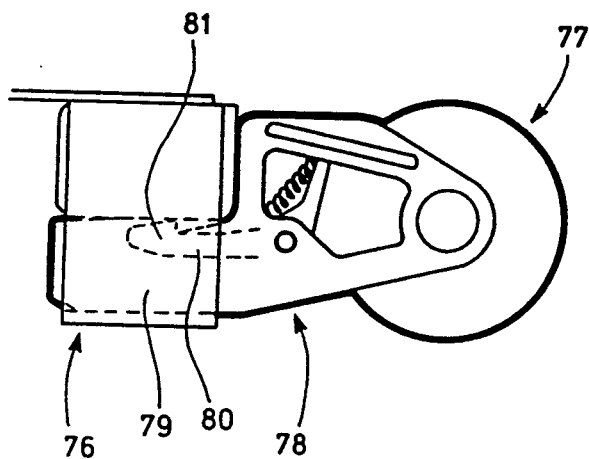
FIGS. 34 and 35 are side views, in the mounted state and in section in the dismantled state respectively, of one of the rollers used for loading and unloading.
Figure 35:
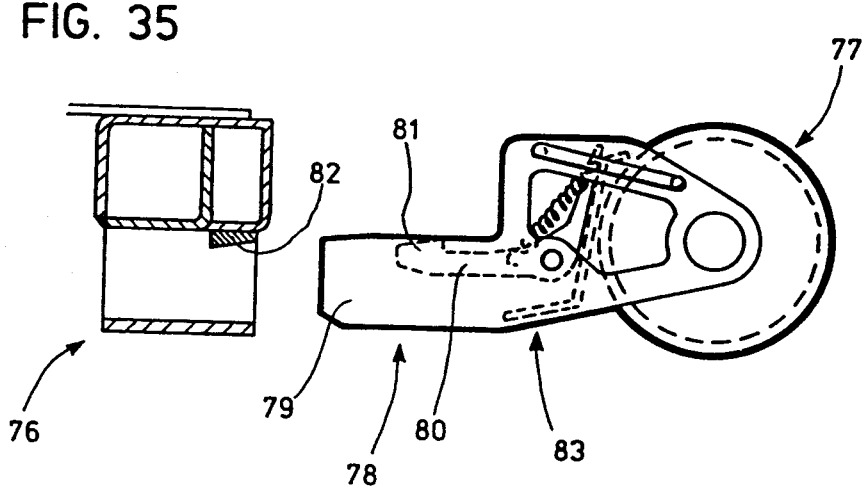

To facilitate loading by the lifting or tilting means on the VTL vehicle, the shelter/container according to the invention has one or more recesses such as 76, for example, on the bottom cross-member forming an accessory to the base 11, as seen in FIGS. 34 and 35 for the purpose of holding removable rollers 77 for resting on the ground (FIGS. 34 to 36).

The number of rollers is not limitative. There can be one large central roller or two or three rollers disposed uniformly across the width of the shelter/container.

The rollers 77 are mounted so as to be rotatable on insertable holders 78 comprising an end 79 for fitting and locking in the recesses 76. They are locked by a pivoting lug 80 having a hooked end 81 which engages a stop projection 82 on each recess 76.

The pivoting locking lug 80 is mounted so as to be resiliently returned towards its top or locking position, and can be tilted downwards towards the release position by action on a release lever 83.

After use, the removable roller or rollers are removed and stored, for example, in a box.

The constructional details are given hereinafter.

The floor surface is made up of C-section edges connected at their ends by folded cross-members, and also comprises a frame of joists formed by the cross-members, a sandwich-type panel having an inner facing, an insulating polyurethane foam and an outer facing.

The front skeleton comprises a frame received by the four ISO corners of the bottom structure, and also comprises two central, vertical front uprights prolonging the means guiding the base-frame and a horizontal cross-member incorporating the lifting and tilting device, for example, a guide and a gripping ring for loading and unloading on the VTL vehicle.

The front wall is, for example, of the sandwich kind, like the floor wall, and preferably but non-limitatively comprises aluminium tube reinforcements.

The rear surface of the shelter/container is substantially identical in construction to the front surface and has a rear skeleton, two central, vertical rear uprights prolonging the longitudinal guide members, a sandwich-type rear wall, and preferably a single incorporated box with a double door opening on to the exterior and occupying the entire area of the rear wall.

Advantageously the side surfaces are openable and comprise a side panel which can be folded downwards around a horizontal bottom pivot, and a side panel which can be raised around a horizontal top pivot.

The side-panel structure is made up of aluminium tube cross-members covered by a metal sheet for forming the floor extension when the shelter is in the operating position, and also comprises a second aluminium sheet on the outer surface of the shelter and a polyurethane foam insulating member inserted between the two sheets.

In the operating position, the side panel rests on cross-members which slide or are pivoted to the edges of the floor surface and are lockable in the retracted and the extended position.

The liftable side panel, which is of the sandwich kind, can be raised manually to the high position and is held by three movable aluminium posts. The lifting hinge forming the top horizontal pivot is constructed so as to be sealing-tight to running water, and at least one device is provided for locking the side panel, the lifting means and the container on the outside thereof.

The roof surface of the shelter is received on the top frame of the container and is made up of a square or rectangular-tube frame connected by four ISO corners, and a sandwich-type roof panel.

A number of accessories can be provided, for example, four access stairways leading to the doors of the extension, and a ladder which, like the stairs, is disposed in the boxes during transport.

The internal fittings of the shelter, the electric connections and the plumbing are provided in dependence on the intended use, and the materials are chosen in accordance with the building, fire-proofing and safety standards in force. All materials are also treated to withstand corrosion and saline mist.

I claim:

1. A habitable shelter/container, comprising:
   a skeleton framework;
   fixed panel means and movable panel means mounted upon said framework so as to define an interior space which has a predetermined size when said movable panel means are disposed at first positions upon said framework and an enlarged size when said movable panel means are disposed at second positions upon said framework;
   a plurality of lifting and supporting props disposed within corner regions of said framework;
   means for moving said plurality of props laterally outwardly and laterally inwardly between extended and retracted positions with respect to said corner regions of said framework; and
   means for vertically moving said plurality of props between extended and retracted positions with respect to said corner regions of said framework so as to lift and support said shelter/container at predetermined elevations with respect to a support surface upon which said plurality of lifting and supporting props are disposed.

2. A shelter/container as set forth in claim 1, wherein:
   said corner regions of said framework comprise vertically disposed box-type uprights.

3. A shelter/container according to claim 2, characterized in that:
   said supporting and lifting props are disposed within said box-type uprights of said framework when said supporting and lifting props are disposed at their laterally inwardly retracted positions.

4. A shelter/container as set forth in claim 3, wherein:
   said supporting and lifting props each comprise a tubular body, a support rod telescopically movable into and out of said tubular body, and a bearing plate fixedly attached to a lower, distal end of said telescopically movable support rod for engaging said support surface upon which said plurality of lifting and supporting props are supportably disposed.

5. A shelter/container according to claim 4, characterized in that said means for moving said plurality of props laterally outwardly and laterally inwardly comprises a jointed assembly comprising pivotable jointed cross-pieces pivotably connected to said box-type uprights and said tubular body.

6. A shelter/container as set forth in claim 5, wherein:
   said jointed assembly comprises a pair of cross-pieces pivotably jointed together at central portions thereof;

one end of a first one of said pair of cross-pieces being pivotably connected to said box-type upright about a pivotable axis fixed upon said box-type upright while a second end of said first one of said pair of cross-pieces is pivotably connected to said tubular body about a pivotable axis which is slidably movable within a slot member of said tubular body; and one end of a second one of said pair of cross-pieces is pivotably connected to said tubular body about a pivotable axis fixed upon said tubular body while a second end of said second one of said pair of cross-pieces is pivotably connected to said box-type upright about a pivotable axis which is slidably movable within a slot member of said box-type upright.

7. A shelter/container according to claim 6, characterized in that:

each one of said props is locked in its laterally outwardly extended position by means of a wedging member inserted into said slots of said tubular body and said box-type upright.

8. A shelter/container according to claim 3, characterized in that:

said shelter/container comprises a rectangular parrallelepiped comprising a roof portion, a floor portion, two longitudinally extending side portions, and two laterally extending end portions;

said fixed panel means define said roof, floor, and end portions of said shelter/container; and said movable panel means define said side portions of said shelter/container, said movable panel means defining each one of said side portions of said shelter/container comprising first and second panels oppositely pivotable upon said corner uprights and third and fourth panels oppositely pivotable upon longitudinally extending members of said skeleton framework disposed within said roof and floor portions of said shelter/container such that said movable panel means define a canopy after said movable panel members are moved to said second positions.

9. A shelter/container according to claim 3, characterized in that:

said shelter/container comprises a rectangular parallelepiped comprising a roof portion, a floor portion, two longitudinally extending side portions, and two laterally extending end portions;

said fixed panel means define said roof, floor, and end portions of said shelter/container; and said movable panel means define said side portions of said shelter/container, said movable panel means defining each one of said side portions of said shelter/container comprising first and second panels oppositely pivotable upon longitudinally extending members of said skeleton framework disposed within said roof and floor portions of said shelter/container and third and fourth panels oppositely pivotable upon one of said first and second panels such that said movable panel means define a canopy after said movable panel members are moved to said second positions.

10. A shelter/container as set forth in claim 4, wherein:

said support rod comprises a component part of a screw jack; and a crank is rotatably mounted upon said tubular body for controlling said support rod.

11. A shelter/container as set forth in claim 3, wherein:

said supporting and lifting props each comprises a pair of independent tubular bodies, a support rod telescopically movable into and out of said tubular bodies, and a bearing plate fixedly attached to a lower, distal end of said telescopically movable support rod for engaging said support surface upon which said plurality of lifting and supporting props are supportably disposed.

12. A shelter/container as set forth in claim 11, wherein:

said means for moving said plurality of props laterally outwardly and laterally inwardly comprises a jointed assembly comprising pivotable jointed cross-pieces pivotably connected to said box-type uprights and said tubular bodies.

13. A shelter/container as set forth in claim 12, wherein:

said jointed assembly comprises a pair of cross-pieces pivotably jointed together at central portions thereof;

one end of a first one of said pair of cross-pieces being pivotably connected to said box-type upright about a pivotable axis fixed upon said box-type upright while a second end of said first one of said pair of cross-pieces is pivotably connected to a first one of said pair of tubular bodies about a pivotable axis which is fixed upon said first one of said pair of tubular bodies; and one end of a second one of said pair of cross-pieces is pivotably connected to a second one of said pair of tubular bodies about a pivotable axis which is fixed upon said second one of said pair of tubular bodies while a second end of said second one of said pair of cross-pieces is pivotably connected to said box-type upright about a pivotable axis which is slidably movable within a slot member of said box-type upright.

14. A shelter/container as set forth in claim 11, wherein:

said support rod comprises a component part of a screw jack; and a crank is rotatably mounted upon one of said tubular bodies for controlling movement of said support rod with respect to said tubular bodies.

15. A shelter/container as set forth in claim 13, further comprising:

wedge means insertable within said slot member of said box-type upright for locking each one of said props in its laterally outwardly extended positions.

16. A shelter/container as set forth in claim 8, further comprising:

recess means defined within said longitudinally extending members of said skeleton framework disposed within said floor portion of said shelter/container for receiving fork structures of a fork-lift truck whereby said shelter/container may be transported by said fork-lift truck.

17. A shelter/container as set forth in claim 9, further comprising:

recess means defined within said longitudinally extending members of said skeleton framework disposed within said floor portion of said shelter/container for receiving fork structures of a fork-lift truck whereby said shelter/container may be transported by said fork-lift truck.

18. A shelter/container as set forth in claim 8, further comprising:

gripping means provided upon at least one of said two laterally extending end portions of said shelter/container for facilitating transportation and movement of said shelter/container by crane structure.

19. A shelter/container as set forth in claim 9, further comprising:

gripping means provided upon at least one of said two laterally extending end portions of said shelter/container for facilitating transportation and movement of said shelter/container by crane structure.

20. A shelter/container as set forth in claim 11, further comprising:

means provided upon an undersurface portion of said skeleton framework of said shelter/container for cooperating with conveying means provided upon transport vehicles in order to facilitate loading of said shelter/container upon said transport vehicles.

21. A shelter/container as set forth in claim 20, wherein:

said means for cooperating with said conveying means of said transport vehicles comprises recess means and bearing structures for respectively accommodating guide rails and roller bearings of said transport vehicles.

22. A shelter/container as set forth in claim 20, wherein:

said transport vehicles comprise roadway trucks and cargo aircraft.

* * * * *